United States Patent
Horiuchi

(10) Patent No.: US 11,356,050 B2
(45) Date of Patent: *Jun. 7, 2022

(54) POWER CONVERSION DEVICE, MOTOR MODULE, ELECTRIC POWER STEERING DEVICE

(71) Applicant: Nidec Corporation, Kyoto (JP)

(72) Inventor: Motoki Horiuchi, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 202 days.

This patent is subject to a terminal disclaimer.

(21) Appl. No.: 16/628,708

(22) PCT Filed: Jun. 28, 2018

(86) PCT No.: PCT/JP2018/024658
§ 371 (c)(1),
(2) Date: Jan. 6, 2020

(87) PCT Pub. No.: WO2019/026492
PCT Pub. Date: Feb. 7, 2019

(65) Prior Publication Data
US 2020/0195190 A1  Jun. 18, 2020

(30) Foreign Application Priority Data
Jul. 31, 2017  (JP) .............................. JP2017-148327

(51) Int. Cl.
*H02P 3/00* (2006.01)
*H02P 29/032* (2016.01)
(Continued)

(52) U.S. Cl.
CPC .......... *H02P 29/032* (2016.02); *B62D 5/0421* (2013.01); *H02M 7/537* (2013.01); *H02P 27/08* (2013.01)

(58) Field of Classification Search
CPC .......... H02P 6/085; H02P 21/22; H02P 27/08; B62D 5/0484; B62D 6/00; B62D 5/0481;
(Continued)

(56) References Cited

U.S. PATENT DOCUMENTS 8,660,755 B2  2/2014  Kuroda
2009/0184681 A1*  7/2009  Kuno .................. B60L 53/14
                                                              320/128
(Continued)

FOREIGN PATENT DOCUMENTS

JP  2014-192950 A  10/2014
JP  2015-080327 A  4/2015

OTHER PUBLICATIONS

Official Communication issued in International Patent Application No. PCT/JP2018/024658, dated Oct. 9, 2018.

*Primary Examiner* — Kawing Chan
*Assistant Examiner* — Gabriel Agared
(74) *Attorney, Agent, or Firm* — Keating & Bennett

(57) ABSTRACT

A power conversion device includes a first inverter, a second inverter, first and second controller to control the first and second inverters, and a driving circuit to apply a control signal to turn on the low side switch elements of the first inverter when a fault occurs on the first inverter side, and apply a control signal to turn on the low side switch elements of the second inverter when a fault occurs on the second inverter side. The first power voltage generated on the first inverter side is supplied to the driving circuit when a fault occurs on the second inverter side, and the second power voltage generated on the second inverter side is supplied to the driving circuit when a fault occurs on the first inverter side.

23 Claims, 10 Drawing Sheets

(51) Int. Cl.
  *B62D 5/04*    (2006.01)
  *H02M 7/537*   (2006.01)
  *H02P 27/08*   (2006.01)

(58) Field of Classification Search
  CPC .. B62D 5/046; H02M 7/53871; H02M 7/537; H02M 7/493; H02M 1/32; H02M 1/325; H02M 1/08
  USPC .................................................. 318/255, 504
  See application file for complete search history.

(56) References Cited

U.S. PATENT DOCUMENTS

| | | | | |
|---|---|---|---|---|
| 2009/0195197 | A1* | 8/2009 | Nishimura | B60L 15/025 318/400.09 |
| 2011/0029179 | A1* | 2/2011 | Miyazaki | B60L 50/16 701/22 |
| 2011/0199030 | A1* | 8/2011 | Suzuki | B62D 5/0481 318/400.3 |
| 2015/0077030 | A1* | 3/2015 | Soh | H02P 27/08 318/504 |
| 2016/0006377 | A1* | 1/2016 | Hashimoto | B60L 50/62 290/31 |

* cited by examiner

POWER CONVERSION DEVICE, MOTOR MODULE, ELECTRIC POWER STEERING DEVICE

CROSS REFERENCE TO RELATED APPLICATIONS

This is a U.S. national stage of PCT Application No. PCT/JP2018/024658, filed on Jun. 28, 2018, and priority under 35 U.S.C. § 119(a) and 35 U.S.C. § 365(b) is claimed from Japanese Application No. 2017-148327, filed Jul. 31, 2017; the entire disclosures of each application being hereby incorporated herein by reference.

1. FIELD OF THE INVENTION

The present disclosure relates to a power conversion device to convert power received from a power supply into power supplied to an electric motor, a motor module, and an electric power steering device.

2. BACKGROUND

Recently, electromechanical type motors integrating an electric motor (hereinafter, simply referred to as a 'motor') and an electrical control unit (ECU) are developed. Particularly in the field of on-vehicle, high quality assurance is required from the perspective of safety. Therefore, redundant designs capable of continuing safety operation even when some of parts fault are introduced. As an example of redundant design, it is considered to install two inverters for one motor. As another example, it is considered to install a microcontroller for backup, in addition to a main microcontroller.

A power conversion device having a control unit and two inverters and converting power received from a power supply into power supplied to a three-phase motor is known. Each of the two inverters is connected to the power supply and the ground (hereinafter, referred to as 'GND') . . . . An inverter on one side is connected to an end of a three-phase winding of the motor, and an inverter on the other side is connected to the other end of the three-phase winding. Each inverter has a bridge circuit configured of three legs, each of which includes a high side switch element and a low side switch element. When a fault is detected in a switch element of the two inverters, the control unit switches control of the motor from control at normal times to control at abnormal times. In the control at normal times, for example, the motor is driven by switching the switch elements of the two inverters. In the control at abnormal times, for example, the motor is driven by an inverter, which is not faulty, by using a neutral point of the winding of a faulty inverter.

In the conventional technique described above, it is required to further improve the control when a peripheral circuit of an inverter is faulty. Here, the peripheral circuit is a circuit needed to drive the inverter and includes, for example, a controller, a pre-driver, a power circuit and the like, which will be described below. A fault of the peripheral circuit means, for example, a fault of the pre-driver or the power circuit. In the circuit configuration, when a fault also occurs in the controller, in addition to a fault in a switch element of an inverter, it is difficult to continue driving of the motor.

SUMMARY

A power conversion device according to an example embodiment of the present disclosure is a power conversion device to convert power received from a power supply into power supplied to a motor including windings of n phases, n being an integer equal to or greater than 3, the power conversion device including a first inverter connected to a first end of a winding of each phase of the motor and including n legs, each of which includes a low side switch element and a high side switch element, a second inverter connected to a second end of the winding of each phase and including n legs, each of which includes a low side switch element and a high side switch element, a first control circuit to control switching operation of n low side switch elements and n high side switch elements in the first inverter, a second control circuit to control switching operation of n low side switch elements and n high side switch elements in the second inverter, and a driving circuit connected to the n low side switch elements of the first inverter and the n low side switch elements of the second inverter to apply a control signal to turn on the n low side switch elements of the first inverter to the n low side switch elements when a fault occurs on the first inverter side of the motor, and apply a control signal to turn on the n low side switch elements of the second inverter to the n low side switch elements when a fault occurs on the second inverter side of the motor, wherein a first power voltage generated on the first inverter side of the motor is supplied to the driving circuit when a fault occurs on the second inverter side of the motor, and in addition, a second power voltage generated on the second inverter side of the motor is supplied to the driving circuit when a fault occurs on the first inverter side of the motor. The driving circuit is controlled by the second control circuit when a fault occurs on the first inverter side of the motor and controlled by the first control circuit when a fault occurs on the second inverter side of the motor.

The above and other elements, features, steps, characteristics and advantages of the present disclosure will become more apparent from the following detailed description of the example embodiments with reference to the attached drawings.

DETAILED DESCRIPTION

Hereinafter, example embodiments of power conversion devices, motor modules and electric power steering devices of the present disclosure will be described in detail with reference to the accompanying drawings. However, to avoid unnecessary lengthening of the description and to facilitate understanding of those skilled in the art, detailed descriptions more than necessary may be omitted. For example, detailed descriptions of already known functions or duplicated descriptions of practically the same configurations may be omitted.

In this specification, example embodiments of the present disclosure will be described using a power conversion device which converts power received from a power supply into power supplied to a three-phase motor having windings of three phases (U phase, V phase and W phase) as an example. In addition, a power conversion device which converts power received from a power supply into power supplied to an n-phase motor having windings of n phases (n is an integer equal to or greater than 4), such as four phases, five phases or the like, is still within the scope of the present disclosure.

Figure 1:
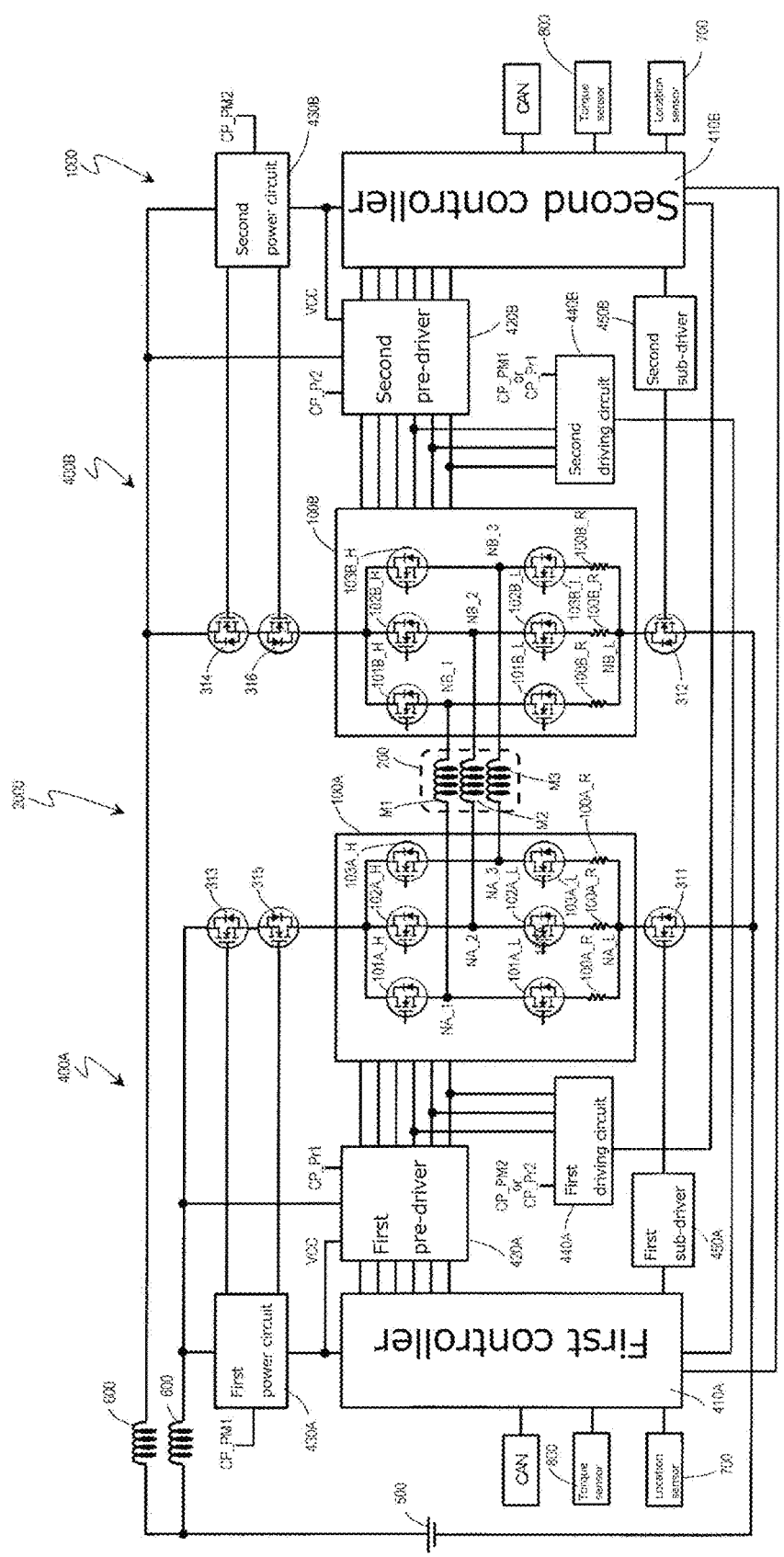
FIG. 1 is a mimetic view showing the block configuration of a motor module 2000 according to a first example embodiment of the present disclosure, mainly showing the block configuration of a power conversion device 1000.

FIG. 1 mimetically shows the block configuration of a motor module 2000 according to a first example embodiment of the present disclosure, mainly mimetically showing the block configuration of a power conversion device 1000. In the block diagram of this specification, the constitutional components on the left side of the motor 200 are expressed as a first inverter 100A, a first peripheral circuit 400A and the like, and the constitutional components on the right side are expressed as a second inverter 100B, a second peripheral circuit 400B and the like, for the convenience of explanation.

The motor module 2000 includes a motor 200 and a power conversion device 1000. The motor module 2000 is modularized and may be manufactured and sold, for example, as an electromechanical type motor including a motor, a sensor, a pre-driver and a controller.

The power conversion device 1000 includes a first inverter 100A, a second inverter 100B, first to sixth switch elements 311, 312, 313, 314, 315 and 316, a first peripheral circuit 400A, and a second peripheral circuit 400B.

The power conversion device 1000 is connected to the motor 200 and also connected to a power supply 500 through a coil 600. The power conversion device 1000 may convert power received from the power supply 500 into power supplied to the motor 200. For example, the first inverter 100A and the second inverter 100B may convert direct current power into three-phase alternate current power of a pseudo sine wave of U phase, V phase and W phase.

The motor 200 is, for example, a three-phase AC motor. The motor 200 has winding M1 of U phase, winding M2 of V phase and winding M3 of W phase and is connected to the first inverter 100A and the second inverter 100B. Describing specifically, the first inverter 100A is connected to an end of the winding of each phase of the motor 200, and the second inverter 100B is connected to the other end of the winding of each phase. The motor connection like this is different from the so-called star connection or delta connection. In this specification, 'connection' between parts (constitutional components) mainly means electrical connection.

The first inverter 100A includes three legs, each of which has a low side switch element and a high side switch element. A leg for U phase has a low side switch element 101A_L and a high side switch element 101A_H. A leg for V phase has a low side switch element 102A_L and a high side switch element 102A_H. A leg for W phase has a low side switch element 103A_L and a high side switch element 103A_H.

As a switch element, for example, a field effect transistor having a parasitic diode formed inside thereof (typically, a MOSFET) or a combination of an insulated gate bipolar transistor (IGBT) and a free wheeling diode connected thereto in parallel may be used. Hereinafter, an example embodiment of using a MOSFET as a switching element will be described, and there are cases in which a switch element is expressed as SW. For example, switch elements 101A_L, 102A_L and 103A_L are expressed as SW 101A_L, 102A_L and 103A_L.

The first inverter 100A is a current sensor for detecting current flowing through each winding of U phase, V phase and W phase and includes three shunt resistors 100A_R. The current sensor includes a current detection circuit (not shown) for detecting current flowing through each of the shunt resistors. As shown in the figure, for example, the three shunt resistors 100A_R are connected between the three low side switch elements included in the three legs of the first inverter 100A and the GND, respectively. The resistance value of the shunt resistor is, for example, about 0.5 to 1.0 m$\Omega$.

The second inverter 100B includes three legs, each of which has a low side switch element and a high side switch element, like the first inverter 100A. A leg for U phase has a low side switch element 101B_L and a high side switch element 101B_H. A leg for V phase has a low side switch element 102B_L and a high side switch element 102B_H. A leg for W phase has a low side switch element 103B_L and a high side switch element 103B_H. In addition, the second inverter 100B includes three shunt resistors 100B_R. These shunt resistors are connected between the three low side switch elements included in the three legs and the GND, respectively.

The number of shunt resistors is not limited to three for each inverter. For example, it is possible to use two shunt resistors for U phase and V phase, two shunt resistors for V phase and W phase, and two shunt resistors for U phase and W phase. The number of shunt resistors and disposition of the shunt resistors are properly determined considering the product cost and design specifications, and the like.

In the power conversion device 1000, the first inverter 100A and the second inverter 100B may be electrically connected to the power supply 500 and the GND by the first to fourth switch elements 311, 312, 313 and 314, respectively. Describing specifically, the first switch element 311 switches connection and disconnection of the first inverter 100A and the GND, the second switch element 312 switches connection and disconnection of the second inverter 100B and the GND, the third switch element 313 switches connection and disconnection of the power supply 500 and the first inverter 100A, and the fourth switch element 314 switches connection and disconnection of the power supply 500 and the second inverter 100B.

The first to fourth switch elements 311, 312, 313 and 314 may block current of both directions. For example, a semiconductor switch such as a thyristor, an analog switch IC or a MOSFET, a mechanical relay or the like may be used as the first to fourth switch elements 311, 312, 313 and 314. A combination of a diode and an IGBT or the like may be used without a problem. In this specification, the first to fourth switch elements 311, 312, 313 and 314 are expressed as SW 311, 312, 313 and 314 in some cases. It will be described assuming that SW 311, 312, 313 and 314 are MOSFETs.

SW 311 is disposed to flow forward-current through an internal parasitic diode toward the first inverter 100A. SW 312 is disposed to flow forward-current through a parasitic diode toward the second inverter 100B. SW 313 is disposed to flow forward-current through a parasitic diode toward the power supply 500. SW 314 is disposed to flow forward-current through a parasitic diode toward the power supply 500.

The power conversion device 1000 may further include fifth and sixth switch elements 315 and 316 for protecting from reverse connection as shown in the figure. The fifth and sixth switch elements 315 and 316 are typically MOSFET semiconductor switches having a parasitic diode. The fifth switch element 315 is connected to SW 313 in series and disposed to flow forward-current through the parasitic diode toward the first inverter 100A. The sixth switch element 316 is connected to SW 314 in series and disposed to flow forward-current through the parasitic diode toward the second inverter 100B. Even when the power supply 500 is connected in the reverse direction, reverse current may be blocked by the two switch elements for protecting from reverse connection.

It is not limited to the example shown in the figure, the number of switch elements is properly determined considering the design specifications. Particularly, since high quality assurance is required in the field of on-vehicle from the perspective of safety, it is preferable to form a plurality of switch elements for each inverter.

The power supply 500 generates a predetermined power voltage (e.g., 12V). As the power supply 500, for example, a DC power supply is used. However, the power supply 500 may be an AC-DC converter, a DC-DC converter, or a battery (storage battery).

As shown in the figure, the power supply 500 may be a single power supply common to the first inverter 100A and the second inverter 100B or may include a first power supply for the first inverter 100A and a second power supply for the second inverter 100B.

The coil 600 is installed between the power supply 500 and each inverter of the power conversion device 1000. The coil 600 functions as a noise filter and flattens high frequency noises included in the voltage waveform supplied to each inverter or high frequency noises generated from each inverter so that the noises may not be leaked to the power supply 500 side.

A condenser (not shown in Figures) is connected to the power supply terminal of each inverter. The condenser is a so-called bypass condenser and suppresses voltage ripples. The condenser is, for example, an electrolytic condenser, and the capacity and the number of condensers are properly determined according to the design specifications or the like.

The first peripheral circuit 400A is a circuit for controlling drive of the first inverter 100A. The first peripheral circuit 400A includes, for example, a first controller 410A, a first pre-driver 420A, a first power circuit 430A, a first driving circuit 440A, and a first sub-driver 450A.

The second peripheral circuit 400B is a circuit for controlling drive of the second inverter 100B. The second peripheral circuit 400B includes, for example, a second controller 410B, a second pre-driver 420B, a second power circuit 430B, a second driving circuit 440B, and a second sub-driver 450B, like the first peripheral circuit 400A.

Typically, the second peripheral circuit 400B has substantially identical structure and function as those of the first peripheral circuit 400A. More specifically, individual parts have substantially identical structure and function.

The first controller 410A and the second controller 410B are integrated circuit s for controlling the entire power conversion device 1000 and are, for example, a micro controller or a field programmable gate array (FPGA).

The first controller 410A controls the switching operation of the three low side switch elements and the three high side switch elements in the first inverter 100A. The second controller 410B controls the switching operation of the three low side switch elements and the three high side switch elements in the second inverter 100B.

The first controller 410A and the second controller 410B may realize closed loop control by controlling the position, rotation speed, current or the like of the rotor of the motor 200 in target in cooperation or individually. Therefore, typically, the first controller 410A and the second controller 410B include an input port for inputting an output signal from a location sensor 700 which detects the position of the rotor.

The location sensor 700 is realized by the combination of a magnetic resistor (MR) sensor having, for example, a resolver, a hall IC or an MR element, and a sensor magnet. The location sensor 700 detects a location of the rotor (hereinafter, referred to as a 'rotation signal') and outputs the rotation signal to the first controller 410A and the second controller 410B.

The first controller 410A and the second controller 410B may include an input port for inputting an output signal from a torque sensor 800, instead of the input port for the location sensor 700 or together with the input port. In this case, each controller may control targeting motor torque. In addition, each controller may include a dedicated port for connecting to, for example, an on-vehicle control area network (CAN).

Each controller may further include an input port for inputting a current signal outputted from the current sensor described above. Each controller may receive a digital signal converted by an externally attached analog-to-digital (AD) converter as a real current value or may receive an analog signal as is from the current sensor and convert the analog signal into a digital signal inside the controller.

The first controller 410A generates a pulse width modulation (PWM) signal by setting a target current value according to the real current value and the rotation signal of the rotor and outputs the PWM signal to the first pre-driver 420A. The second controller 410B generates a PWM signal in the same manner as the first controller 410A and outputs the PWM signal to the second pre-driver 420B. In addition, in the first exemplary example embodiment of the present disclosure, the first controller 410A outputs a control signal for controlling on/off of SW 311 to the first sub-driver 450A. The second controller 410B outputs a control signal for controlling on/off of SW 312 to the second sub-driver 450B.

The pre-driver is also referred to as a gate driver. A general pre-driver may be widely used as the first pre-driver 420A and the second pre-driver 420B.

The first pre-driver 420A is connected between the first controller 410A and the first inverter 100A. The first pre-driver 420A creates a control signal for controlling the switching operation of the three low side switch elements and the three high side switch elements in the first inverter 100A under the control of the first controller 410A and applies the control signal to the switch elements. Specifically, the first pre-driver 420A creates a control signal (gate control signal) for controlling the switching operation of each SW in the first inverter 100A according to the PWM signal received from the first controller 410A and applies the control signal to the gate of each SW.

The second pre-driver 420B is connected between the second controller 410B and the second inverter 100B. The second pre-driver 420B creates a control signal for the controlling switching operation of the three low side switch elements and the three high side switch elements in the second inverter 100B under the control of the second controller 410B and applies the control signal to the switch elements. Specifically, the second pre-driver 420B creates a control signal (gate control signal) for controlling the switching operation of each SW in the second inverter 100B according to the PWM signal received from the second controller 410B and applies the control signal to the gate of each SW.

The first pre-driver 420A may generate a voltage CP_Pr1 higher than the voltage (e.g., 12V) of the power supply 500. The second pre-driver 420B may generate a voltage CP_Pr2 higher than the voltage of the power supply 500. The boost voltages CP_Pr1 and CP_Pr2 are, for example, 18V or 24V. Each pre-driver is a driver of a charge pump type.

Each of the first power circuit 430A and the second power circuit 430B is, for example, a power supply IC. Power of, for example, 12V is supplied from the power supply 500 to the first power circuit 430A and the second power circuit 430B. The first power circuit 430A supplies power voltage needed for each of the blocks of the first peripheral circuit 400A, respectively. The second power circuit 430B supplies power voltage needed for each of the blocks of the second peripheral circuit 400B, respectively.

The first power circuit 430A supplies power voltage VCC of, for example, 5.0V or 3.3V to the first controller 410A and the first pre-driver 420A. In the first example embodiment of the present disclosure, the first power circuit 430A may apply a control signal for controlling on/off of SW 313 and 315 to the switches.

The second power circuit 430B supplies power voltage VCC of, for example, 5.0V or 3.3V to the second controller 410B and the second pre-driver 420B. In the first example embodiment of the present disclosure, the second power circuit 430B may apply a control signal for controlling on/off of SW 314 and 316 to the switches.

The first power circuit 430A may generate a voltage CP_PM1 higher than the voltage of the power supply 500. The second power circuit 430B may generate a voltage CP_PM2 higher than the voltage of the power supply 500. The boost voltages CP_PM1 and CP_PM2 are, for example, 18V or 24V.

In the first example embodiment of the present disclosure, a voltage higher than the voltage of the power supply 500 is needed. Therefore, as described above, such a high voltage is generated using each pre-driver and each power circuit. However, it is preferable to provide at least one block for boosting the voltage of the power supply 500 in each peripheral circuit, and for example, a voltage higher than the voltage of the power supply 500 may be generated by either the pre-driver or the power circuit.

Here, before describing the first driving circuit 440A and the second driving circuit 440B, a gate control signal generated by the first pre-driver 420A and the second pre-driver 420B will be described. Hereinafter, the gate control signal will be described using the first pre-driver 420A as an example.

In this specification, control of the power conversion device 1000 when a fault does not occur in the power conversion device 1000 is expressed as 'control at normal times', and control when a fault occurs is expressed as 'control at abnormal times'.

In the control at normal times, SW 311, 312, 313, 314, 315 and 316 are in an on state. Accordingly, the potential of node NA_L connecting SW 101A_L, 102A_L and 103A_L in the first inverter 100A becomes the GND potential. Therefore, the reference potential, i.e., the source potential, of the gates of SW 101A_L, 102A_L and 103A_L becomes low potential. In that case, the voltage level of the gate control signal applied to the gate of the SW may be comparatively low, and the switching operation of the low side switch element can be controlled without any problems. Hereinafter, the voltage of the gate control signal is referred to as 'gate voltage' in some cases.

Meanwhile, the reference potential of the three SW 101A_H, 102A_H and 103A_H of the first inverter 100A is high since it becomes the potential of the nodes NA_1, NA_2 and NA_3 between the low side switch element and the high side switch element, i.e., the driving voltage supplied to the windings M1, M2 and M3 of each phase. To turn on the high side switch element, a gate voltage higher than the gate voltage applied to the low side switch element needs to be applied to the high side switch element.

As is already described, the first pre-driver 420A may generate a voltage of 18V by boosting, for example, a voltage of 12V and apply a high voltage to SW 101A_H, 102A_H and 103A_H. As a result, the high side switch element may be properly turned on in a switching operation. In this manner, the first pre-driver 420A applies a high gate voltage, which is higher than the gate voltage applied to the low side switch element, to the high side switch element in the control at normal times. The gate voltage applied to the low side switch element is, for example, 12V, and the gate voltage applied to the high side switch element is, for example, 18V.

A case in which a fault occurs in the power conversion device 1000 is considered. The 'fault' mainly refers to a failure that occurs in a peripheral circuit. That a fault occurs on the first inverter 100A side of the motor 200 means that a fault occurs within the first peripheral circuit 400A, and more specifically, it means that, for example, the first controller 410A, the first pre-driver 420A, or the first power circuit 430A is faulty and thereby becomes inoperable. That a fault occurs on the second inverter 100B side means that a fault occurs within the second peripheral circuit 400B, and more specifically, it means that, for example, the second controller 410B, the second pre-driver 420B, or the second power circuit 430B is faulty and becomes inoperable.

For example, it is assumed that the first pre-driver 420A is faulty. In this case, the first pre-driver 420A is naturally controlled by the first controller 410A and may not drive the first inverter 100A. However, if the node NA_L on the low side of the first inverter 100A may function as a neutral point, the motor 200 can be continuously driven by driving the second inverter 100B using the neutral point.

In the first example embodiment of the present disclosure, for example, when the first pre-driver 420A is faulty, the node NA_L on the low side of the first inverter 100A functions as a neutral point. At this point, the first switch element 311 is turned off to properly perform the current control. The neutral point is electrically separated from the GND. As a result, the potential of the node NA_L on the low side is not equal to the GND potential and becomes a potential higher than the GND potential. In other words, the reference potential of the gates of SW 101A_L, 102A_L and 103A_L is in a floating state. In that state, when a gate voltage of an amplitude which is the same as that of a gate voltage (e.g., 12V) in the control at normal times is applied to the low side switch element, the voltage between the gate and the source is reduced compared with that of the control at normal times.

If the voltage between the gate and the source decrease, the on-resistance value between the source and the drain of SW 101A_L, 102A_L and 103A_L may increase, or SW 101A_L, 102A_L and 103A_L may be turned off unintentionally. In order to make the node NA_L on the low side of the first inverter 100A function as a neutral point, it is necessary to properly turn on SW 101A_L, 102A_L and 103A_L. Therefore, the gate voltages applied to SW 101A_L, 102A_L and 103A_L need to be higher than those of the control at normal times.

On the basis of the problems described above, the power conversion device 1000 according to the present disclosure includes a first driving circuit 440A and a second driving circuit 440B. Since the circuit structure and the function of the second driving circuit 440B are substantially the same as those of the first driving circuit 440A, hereinafter, the circuit structure and the function of the first driving circuit 440A will mainly described as an example.

The first driving circuit 440A is connected to the three low side switch elements of the first inverter 100A. The first driving circuit 440A is a dedicated driving circuit for turning on SW 101A_L, 102A_L and 103A_L of the first inverter 100A at all times when a fault occurs on the first inverter 100A side of the motor 200. By the first driving circuit 440A, the node NA_L on the low side of the first inverter 100A may properly function as a neutral point.

The second driving circuit 440B is connected to the three low side switch elements of the second inverter 100B. The second driving circuit 440B is a dedicated driving circuit for turning on SW 101B_L, 102B_L and 103B_L of the second inverter 100B at all times when a fault occurs on the second inverter 100B side of the motor 200. By the second driving circuit 440B, the node NB_L on the low side of the second inverter 100B may properly function as a neutral point.

In the control at normal times, the gate control signal of the low side switch element is supplied from the first pre-driver 420A to SW 101A_L, 102A_L and 103A_L. In the control at abnormal times, the gate control signal is supplied from the first driving circuit 440A to SW 101A_L, 102A_L and 103A_L.

The voltage level of the control signal applied to the three low side switch elements of the first inverter 100A by the first driving circuit 440A is higher than the voltage level of the control signal applied to the low side switch elements by the first pre-driver 420A. In the first example embodiment of the present disclosure, the voltage level of the control signal applied to the three low side switch elements of the first inverter 100A by the first driving circuit 440A is equal to the voltage level of the control signal applied to the three high side switch elements of the first inverter 100A by the first pre-driver 420A. The gate voltage is, for example, 18V.

The voltage level of the control signal applied to the three low side switch elements of the second inverter 100B by the second driving circuit 440B is higher than the voltage level of the control signal applied to the low side switch elements by the second pre-driver 420B. In the first example embodiment of the present disclosure, the voltage level of the control signal applied to the three low side switch elements of the second inverter 100B by the second driving circuit 440B is equal to the voltage level of the control signal applied to the three high side switch elements of the second inverter 100B by the second pre-driver 420B. The gate voltage is, for example, 18V.

The first driving circuit 440A is controlled by the second controller 410B. The second driving circuit 440B is controlled by the first controller 410A.

When a fault occurs on the second inverter 100B side of the motor 200, a first power voltage generated on the first inverter 100A side is supplied to the second driving circuit 440B. The voltage generated on the first inverter 100A side means a power voltage generated in the first peripheral circuit 400A. For example, the first power voltage is a boost voltage CP_Pr1 generated by the first pre-driver 420A or a boost voltage CP_PM1 generated by the first power circuit 430A. The amplitude of the first power voltage is higher than that of the voltage of the power supply 500 and is, for example, 18V.

When a fault occurs on the first inverter 100A side, a second power voltage generated on the second inverter 100B side is supplied to the first driving circuit 440A. The voltage generated on the second inverter 100B side means a power voltage generated in the second peripheral circuit 400B. For example, the second power voltage is a boost voltage CP_Pr2 generated by the second pre-driver 420B or a boost voltage CP_PM2 generated by the second power circuit 430B. The amplitude of the second power voltage is higher than that of the voltage of the power supply 500 and is, for example, 18V. In the first example embodiment of the present disclosure, the amplitude of the first power voltage is equal to the amplitude of the second power voltage.

The first driving circuit 440A applies a control signal for turning on the three low side switch elements of the first inverter 100A to the low side switch elements by supplying the second power voltage when a fault occurs on the first inverter 100A side of the motor 200. The second driving circuit 440B applies a control signal for turning on the three low side switch elements of the second inverter 100B to the low side switch elements by supplying the first power voltage when a fault occurs on the second inverter 100B side.

Figure 2A:
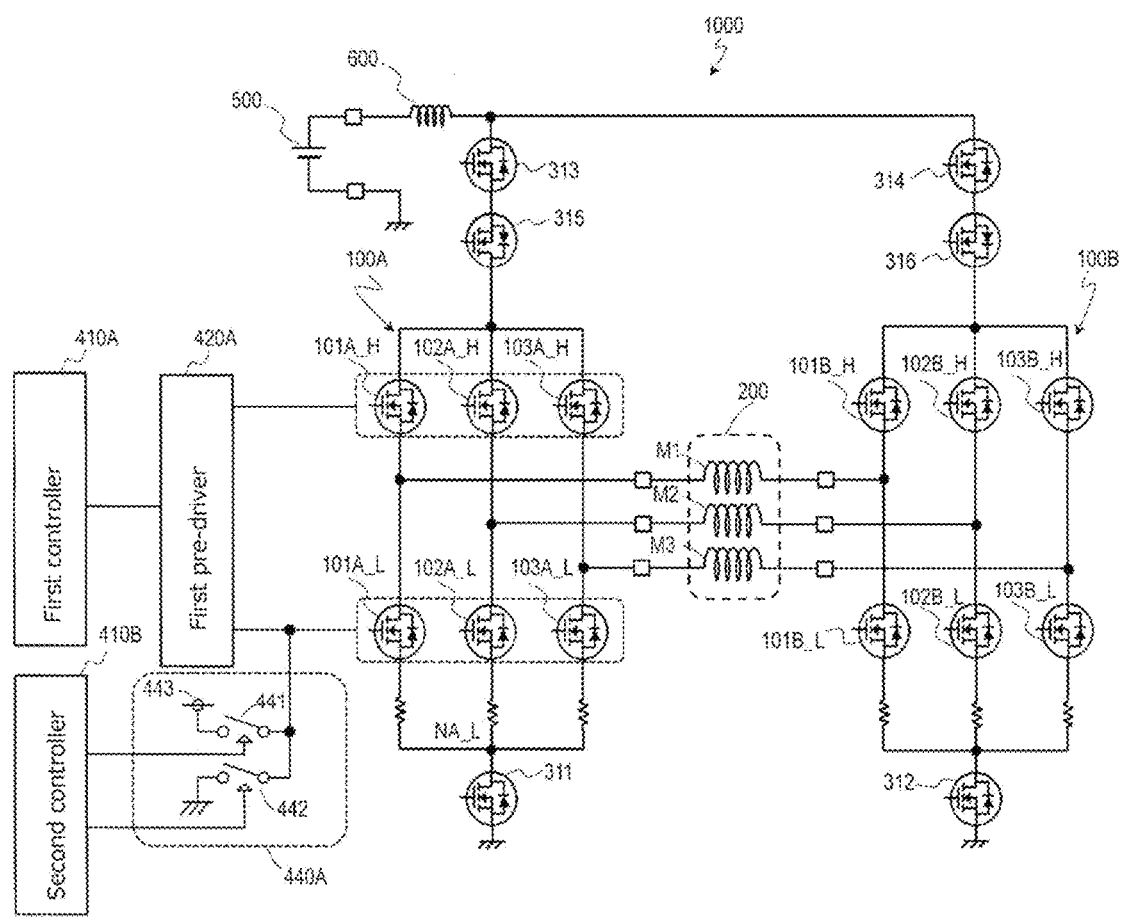
FIG. 2A is a block diagram showing function blocks of a first driving circuit 440A.
Figure 2B:
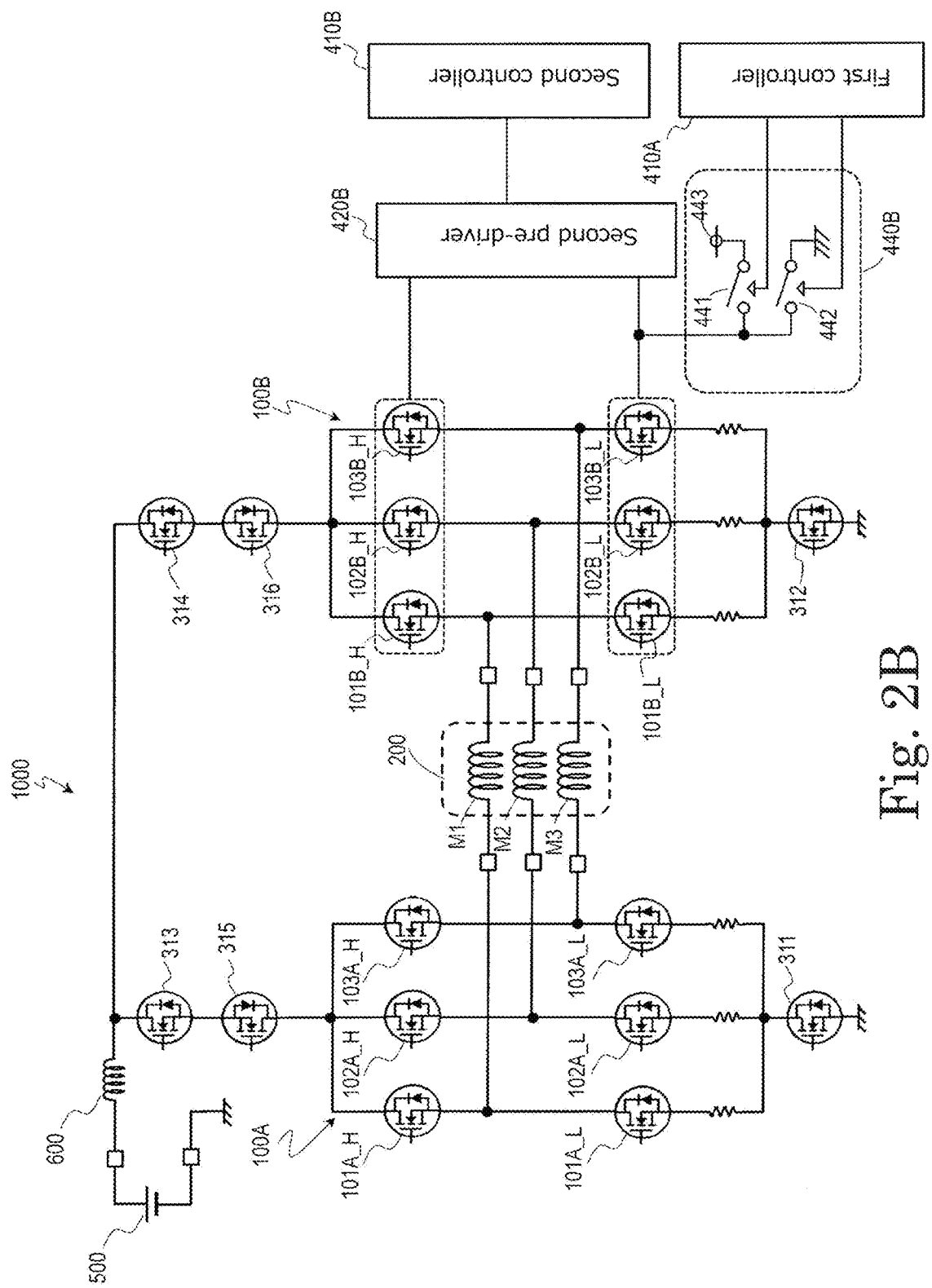
FIG. 2B is a block diagram showing function blocks of a second driving circuit 440B.

FIG. 2A mimetically shows the function blocks of the first driving circuit 440A, and FIG. 2B mimetically shows the function blocks of the second driving circuit 440B.

The second power voltage is supplied to the first driving circuit 440A as the power voltage 443. The second power voltage is, for example, a boost voltage CP_PM2 or CP_Pr2. The first power voltage is supplied to the second driving circuit 440B as the power voltage 443. The first power voltage is, for example, a boost voltage CP_PM1 or CP_Pr1. It should be noted to set the power voltage 443 so that the voltage between the gate and the source of the low side switch element is not higher than the withstand voltage.

Each of the first driving circuit 440A and the second driving circuit 440B has switches 441 and 442, respectively. In the control at normal times, the switches 441 and 442 are off.

When a fault occurs on the first inverter 100A side of the motor 200, the second controller 410B turns on the switch 441 of the first driving circuit 440A. Therefore, the power voltage 443 is applied to the three low side switch elements of the first inverter 100A as a gate voltage. All the three low side switch elements are in an on state, and the node NA_L of the low side of the first inverter 100A may function as a neutral point.

For example, when a fault occurs in the power conversion device 1000, operation of the power conversion device 1000 may be forcibly stopped. In this case, the second controller 410B turns on the switch 442. Since the GND potential is applied to the low side switch elements as a gate voltage, the three low side switch elements are turned to an off state. However, the switch 442 is optional, and may not exist in the driving circuit when a forcible stop is not required.

Figure 3:
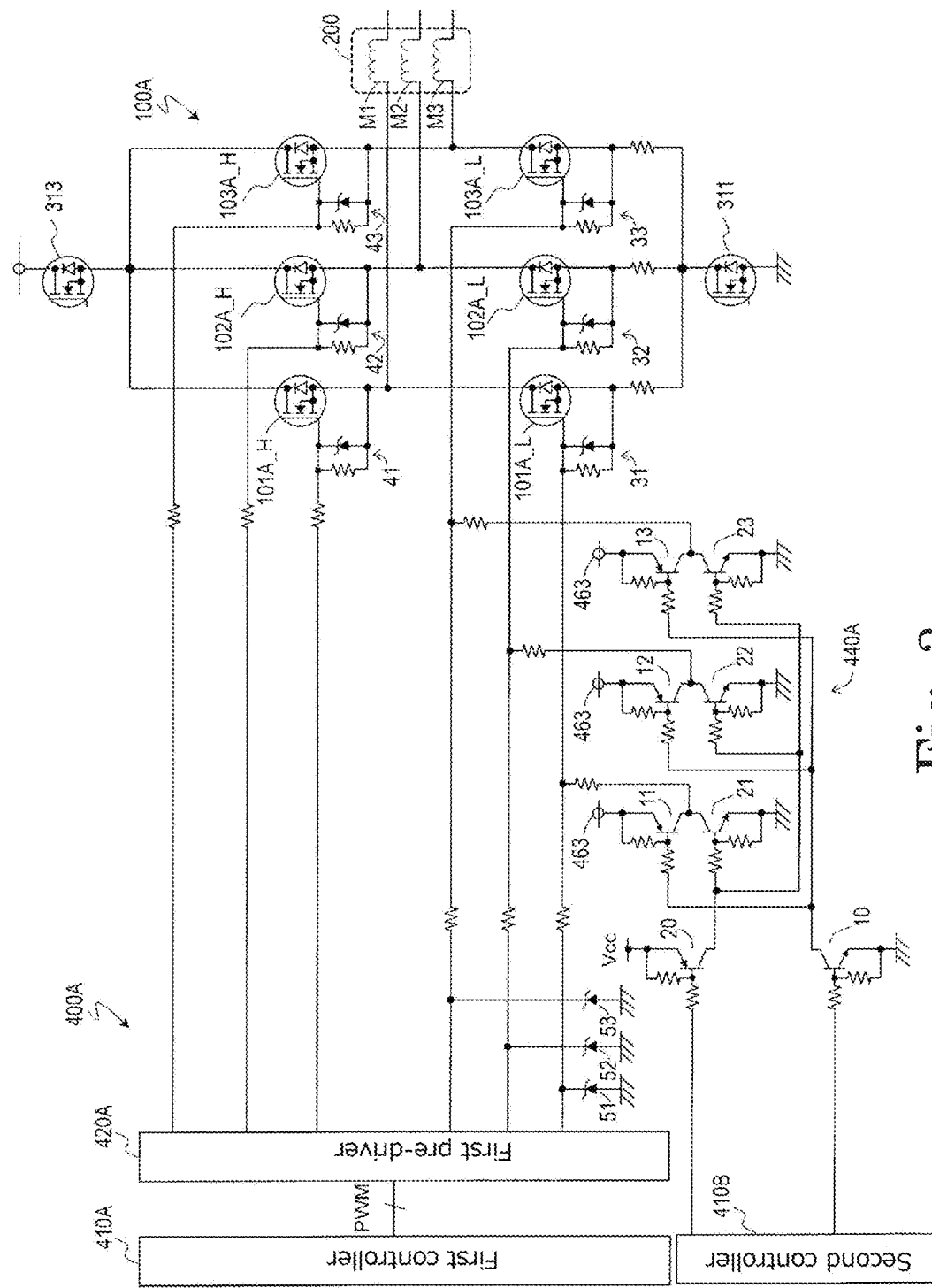
FIG. 3 is a circuit diagram illustrating the circuit configuration of the first driving circuit 440A in a first peripheral circuit 400A.

FIG. 3 mimetically shows the block configuration of the first driving circuit 440A in the first peripheral circuit 400A. In addition, the switch element 315 is not shown in FIG. 3.

The first driving circuit 440A includes a plurality of switch elements 10, 11, 12, 13, 20, 21, 22 and 23 of an open collector output scheme. In the example embodiment shown in the figure, the switch elements 11, 12, 13 and 20 are bipolar transistors of PNP type. The switch elements 10, 21, 22 and 23 are bipolar transistors of NPN type. A push-pull circuit is connected via a resistor to the gate control signal line to control the low side switch element of each phase. The switches 441 and 442 may be configured by combining a plurality of transistors 10, 11, 12, 13, 20, 21, 22 and 23 and a plurality of resistors.

When the second controller 410B pulls the transistor 20, the transistors 21, 22 and 23 are pushed. Therefore, the gate potential of SW 101A_L, 102A_L and 103A_L in the first inverter 100A becomes a low level corresponding to the GND potential. In contrast, if the second controller 410B pushes the transistor 10 in response thereto, the transistors 11, 12 and 13 are pulled, and the gate potential of SW 101A_L, 102A_L and 103A_L becomes a high level corresponding to power voltage 443.

Protection circuits 31, 32 and 33 having a resistor and a diode connected in parallel are connected between the source and the gate of SW 101A_L, 102A_L and 103A_L. Protection circuits 41, 42 and 43 having a resistor and a diode connected in parallel are connected between the source and the gate of SW 101A_H, 102A_H and 103A_H.

The power conversion device 1000 may include first and second protection circuits. The first protection circuit has protection circuits 51, 52 and 53. It is preferable to connect the protection circuit 51 between the output terminal (not shown) of the first pre-driver 420A connected to the gate of SW 101A_L and the GND. In the same manner, it is preferable to connect the protection circuit 52 between the output terminal (not shown) of the first pre-driver 420A connected to the gate of SW 102A_L and the GND and connect the protection circuit 53 between the output terminal (not shown) of the first pre-driver 420A connected to the gate of SW 103A_L and the GND. It is preferable to form the second protection circuit having three protection circuits for the second inverter 100B side of the motor 200 in the same manner.

When a control signal for turning on the three low side switch elements is outputted from the first driving circuit 440A to the first inverter 100A, each of the protection circuits 51, 52 and 53 suppresses input of a signal of a voltage level higher than a regulation value (withstand voltage) into the first pre-driver 420A. Herein, the withstand voltage is, for example, the withstand voltage of a circuit element in the first pre-driver 420A which outputs a gate control signal for SW 101A_L, 102A_L and 103A_L in the control at normal times.

The protection circuits 51, 52 and 53 are, for example, Zener diodes. The protection circuits 51, 52 and 53 function when the voltage of the gate control signal outputted from the first driving circuit 440A is close to or higher than the withstand voltage. For example, when the withstand voltage is 18V, the protection circuits 51, 52 and 53 function when the voltage of the gate control signal is 17V or higher. Therefore, the voltage supplied to the output terminal of the first pre-driver 420A may be lower than the withstand voltage. In the first example embodiment of the present disclosure, a gate voltage higher than the voltage of the control at normal times is supplied to SW 101A_L, 102A_L and 103A_L. Although the high gate voltage unintentionally becomes higher than the withstand voltage, the first pre-driver 420A may be protected by the protection circuits 51, 52 and 53.

According to the first driving circuit 440A, a gate voltage higher than the voltage of the control at normal times may be supplied to SW 101A_L, 102A_L and 103A_L. Although the potential of the source becomes the potential of the neutral point, decrease of the voltage between the gate and the source can be suppressed by increasing the gate voltage. This may suppress increase of the on-resistance value between the source and the drain of SW 101A_L, 102A_L and 103A_L and prevent SW 101A_L, 102A_L and 103A_L from unintentionally being turned off.

The power conversion device 1000 includes ROM (not shown). The ROM is, for example, writable memory (e.g., PROM), rewritable memory (e.g., flash memory) or read only memory. The ROM stores control programs including command groups for controlling the power conversion device 1000 in the first controller 410A and the second controller 410B. For example, the control program is once deployed in the RAM (not shown) when the device is booted.

Hereinafter, the point that should be specially mentioned with respect to power lines and signal lines of a circuit board (e.g., a printed circuit board) on which parts of the power conversion device 1000 are mounted will be described.

The second power voltage generated on the second inverter 100B side of the motor 200 is supplied to the first driving circuit 440A. The first power voltage generated on the first inverter 100A side of the motor 200 is supplied to the second driving circuit 440B. Therefore, a first power line and a second power line are formed on the circuit board. For example, the first power line is a power line for supplying the first power voltage from the first pre-driver 420A or the first power circuit 430A to the second driving circuit 440B. For example, the second power line is a power line for supplying the second power voltage from the second pre-driver 420B or the second power circuit 430B to the first driving circuit 440A.

The first driving circuit 440A is controlled by the second controller 410B, and the second driving circuit 440B is controlled by the first controller 410A. Therefore, a first control signal line and a second control signal line are formed on the circuit board. The first control signal line is a signal line for connecting the first driving circuit 440A and the second controller 410B and controlling the first driving circuit 440A. The second control signal line is a signal line for connecting the second driving circuit 440B and the first controller 410A and controlling the second driving circuit 440B.

Refer to FIG. 1 again.

The first controller 410A and the second controller 410B are connected so as to communicate with each other. Therefore, a communication signal line for performing the communication is formed on the circuit board. As the communication is performed between the first controller 410A and the second controller 410B, one of the first controller 410A and the second controller 410B may monitor occurrence of a fault on the inverter side connected to the other one.

Occurrence of a fault may be detected by using, for example, a watchdog timer. Each of the first controller 410A and the second controller 410B has a watchdog timer. For example, the second controller 410B may detect a fault occurred on the first inverter 100A side using the watchdog timer. Occurrence of a fault may be detected by performing an operation of handshake, polling or interrupt.

For example, when a fault is detected on the second inverter 100B side of the motor 200, the first controller 410A may direct the second driving circuit 440B to start operation. The second driving circuit 440B may apply a control signal for turning on the three low side switch elements of the second inverter 100B to the low side switch elements in response to the direction of starting the operation.

For example, when a fault is detected on the first inverter 100A side of the motor 200, the second controller 410B may direct the first driving circuit 440A to start operation. The first driving circuit 440A may apply a control signal for turning on the three low side switch elements of the first inverter 100A to the low side switch elements in response to the direction of starting the operation.

Like this, since a driving circuit is driven in response to the direction of the controller 410, the driving circuit may be properly driven only when a fault occurs. As a result, low consumption of power can be accomplished, compared with driving the driving circuit at all times.

The first controller 410A and the second power circuit 430B may be connected to communicate with each other, and the second controller 410B and the first power circuit 430A may be connected to communicate with each other. Communications like this may be realized by using serial communication such as I²C or the like. Therefore, for example, even when the first controller 410A is faulty, the second controller 410B may directly communicate with the first power circuit 430A.

A first monitoring signal line and a second monitoring signal line may be further formed on the circuit board. The first monitoring signal line is a signal line for connecting the first pre-driver 420A and the second controller 410B. The second monitoring signal line is a signal line for connecting the second pre-driver 420B and the first controller 410A. The second controller 410B may monitor occurrence of a fault in the first pre-driver 420A by means of the first monitoring signal line. The first controller 410A may monitor occurrence of a fault in the second pre-driver 420B by means of the second monitoring signal line. For example, monitoring like this may be realized by periodically transmitting a status of the pre-driver, specifically, a status signal indicating a fault, from the pre-driver to the controller.

A modified example embodiment of the first example embodiment of the present disclosure will be described with reference to FIG. 4.

Figure 4:
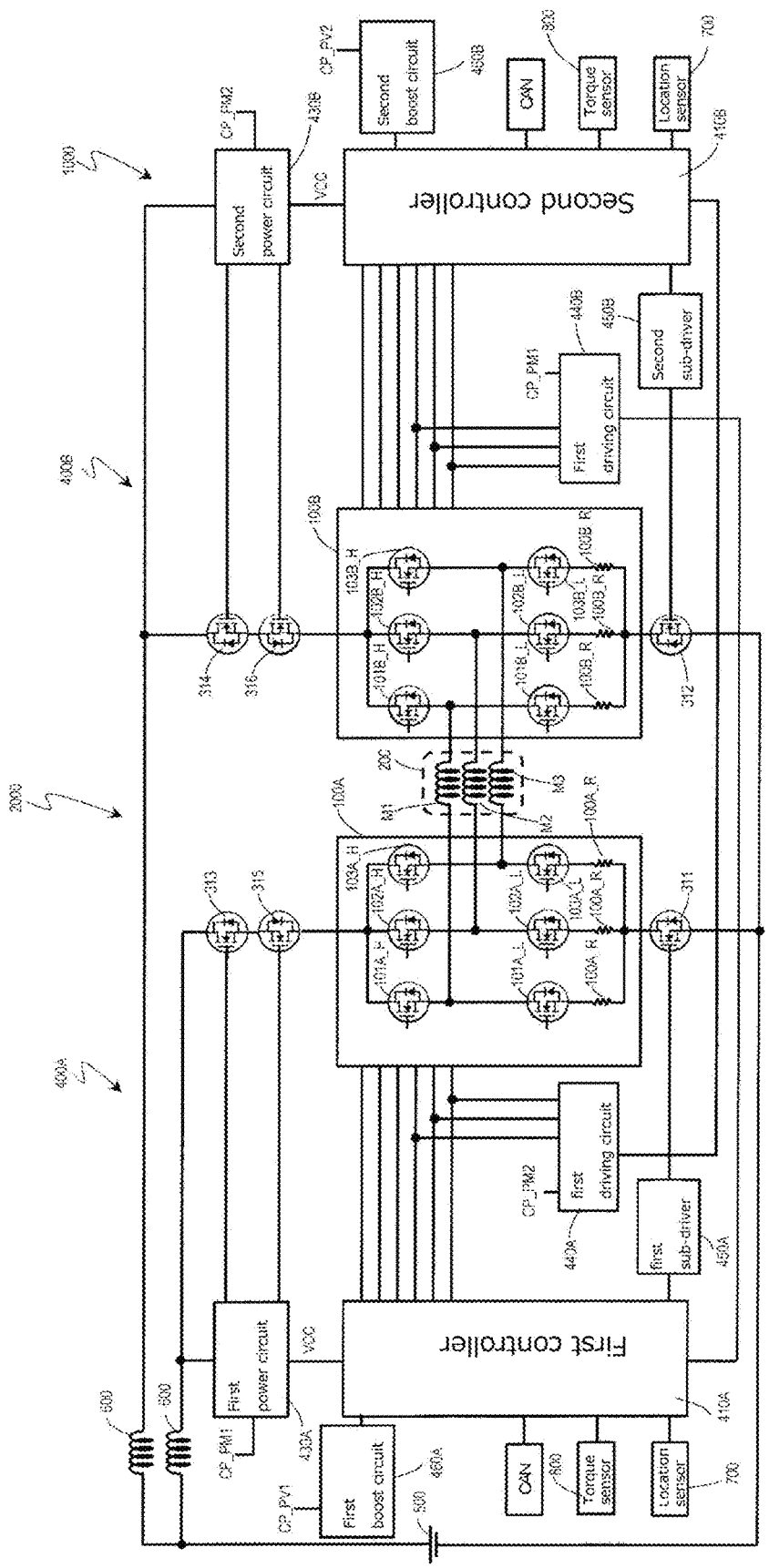
FIG. 4 is a mimetic view showing an example of the block configuration of a power conversion device 1000 according to a modified example embodiment of the first example embodiment of the present disclosure.

FIG. 4 mimetically shows an example of the block configuration of a power conversion device 1000 according to a modified example embodiment of the first example embodiment of the present disclosure.

A power conversion device 1000 according to this modified example embodiment is different from the power conversion device 1000 shown in FIG. 1 in that the first pre-driver 420A and the second pre-driver 420B are not provided. At this point, each of the first and second controllers 410A and 410B may have a pre-driver embedded therein.

Generally, driving a motor requires high voltage and current to drive the switch elements (power elements) of the inverter. The pre-driver is used as a circuit for converting a PWM control signal received from a controller into a signal of high voltage and high current. In other words, motors that can be driven at a low voltage do not necessarily require a pre-driver. Therefore, the function of the pre-driver may be mounted on the controller. In the present modified example embodiment, each of the first and second controllers 410A and 410B has a pre-driver embedded therein.

In the power conversion device 1000 of the present disclosure for supplying power to the motor 200 which can be driven at a low voltage, each of the first and second controllers 410A and 410B may have a pre-driver embedded therein. In that case, the first controller 410A may directly control the first inverter 100A, and the second controller 410B may directly control the second inverter 100B.

The power conversion device 1000 according to the present modified example embodiment is further different from the power conversion device 1000 shown in FIG. 1 in that a first boost circuit 460A and a second boost circuit 460B are further provided in the power conversion device 1000 according to the modified example embodiment.

In the first example embodiment of the present disclosure, an example of generating the first power voltage by the first pre-driver 420A and the first power circuit 430A and generating the second power voltage by the second pre-driver 420B and the second power circuit 430B has been described. The power conversion device 1000 according to the present modified example embodiment includes a boost circuit different from the power circuits and the pre-drivers generating the first power voltage and the second power voltage.

The first boost circuit 460A may be connected to, for example, the first controller 410A. The first boost circuit 460A generates the first power voltage by boosting the voltage of the power supply 500. In the same manner as the first boost circuit 460A, the second boost circuit 460B may be connected to, for example, the second controller 410B. The second boost circuit 460B generates the second power voltage by boosting the voltage of the power supply 500. The first power voltage and the second power voltage are, for example, 18V. In this modified example embodiment, the power voltage generated by the first boost circuit 460A is the first power voltage generated on the first inverter 100A side of the motor, and the power voltage generated by the second boost circuit 460B is the second power voltage generated on the second inverter 100B side of the motor.

In this modified example embodiment, the first power voltage is supplied from the first boost circuit 460A to the second driving circuit 440B, and the second power voltage is supplied from the second boost circuit 460B to the first driving circuit 440A.

First, a specific example embodiment of a control method at normal times of the power conversion device 1000 will be described. At normal times, the power conversion device 1000 and any one of the windings M1, M2 and M3 of three phases of the motor 200 are not faulty.

The first controller 410A outputs a control signal for turning on SW 311 to the first sub-driver 450A. The second controller 410B outputs a control signal for turning on SW 312 to the second sub-driver 450B. The first power circuit 430A outputs a control signal for turning on SW 313 and 315. The second power circuit 430B outputs a control signal for turning on SW 314 and 316.

SW 311, 312, 313, 314, 315 and 316 are all turned on. The power source 500 and the first inverter 100A are electrically connected, and the power source 500 and the second inverter 100B are electrically connected. In addition, the first inverter 100A and the GND are electrically connected, and the second inverter 100B and the GND are electrically connected. In this connection state, the first controller 410A controls the switching operation of the switch element of the first inverter 100A, and in addition, the second controller 410B controls the switching operation of the switch element of the second inverter 100B in synchronization with the first controller 410A. By switching the switch elements of the first inverter 100A and the second inverter 100B, the motor 200 may be driven by flowing current through the windings M1, M2 and M3 of three phases. In this specification, flowing current through the windings of three phases is sometimes referred to as a 'three-phase current flow control'.

Figure 5:
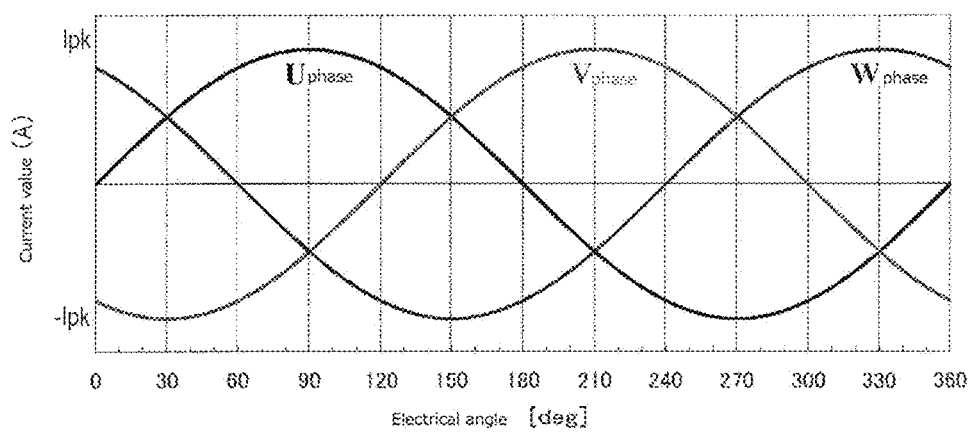
FIG. 5 is a graph illustrating a current waveform (sine wave) obtained by plotting the value of current flowing through the windings of U phase, V phase, and W phase of the motor 200 when the power conversion device 1000 is controlled according to three-phase current flow control.

FIG. 5 is a graph illustrating a current waveform (sine wave) obtained by plotting the value of current flowing through the windings of U phase, V phase, and W phase of the motor 200 when the power conversion device 1000 is controlled according to the three-phase current flow control. The horizontal axis represents an electrical angle (deg) of the motor, and the vertical axis represents the current value (A). In the current waveform of FIG. 5, current values are plotted per every 30° of the electrical angle. $I_{pk}$ denotes the maximum current value (peak current value) of each phase.

Table 1 shows the current value of current flowing through each inverter at each electrical angle in the sine wave of FIG. 5. Specifically, Table 1 shows the current value of the current flowing through the nodes NA_1, NA_2 and NA_3 (see FIG. 1) of the first inverter 100A per every 30° of electrical angle, and the current value of the current flowing through the nodes NB_1, NB_2 and NB_3 (see FIG. 1) of the second inverter 100B per every 30° of electrical angle. Here, for the first inverter 100A, the direction of current flowing from the first inverter 100A to the second inverter 100B is defined as forward direction. The direction of current shown in FIG. 5 follows this definition. In addition, for the second inverter 100B, the direction of current flowing from the second inverter 100B to the first inverter 100A is defined as forward direction. Therefore, the phase difference between the current of the first inverter 100A and the current of the second inverter 100B is 180°. In Table 1, magnitude of the current value $I_1$ is $[(3)^{1/2}/2]*I_{pk}$, and magnitude of the current value $I_2$ is $I_{pk}/2$.

TABLE 1

| | | Electrical angle [deg] | | | | | | | | | | | |
|---|---|---|---|---|---|---|---|---|---|---|---|---|---|
| | | 0 (360) | 30 | 60 | 90 | 120 | 150 | 180 | 210 | 240 | 270 | 300 | 330 |
| First inverter | U phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Second inverter | U phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W phase | $-I_1$ | $-I_2$ | 0 | $I_2$ | $I_1$ | $I_{pk}$ | $I_1$ | $I_2$ | 0 | $-I_2$ | $-I_1$ | $I_{pk}$ |

In the current waveform shown in FIG. 5, the total of current flowing through the windings of three phases considering the direction of current becomes '0' at each electrical angle. However, according to the circuit configuration of the power conversion device 1000, since the current flowing through the windings of three phases can be independently controlled, it may be controlled to make the total of current not to be '0'. For example, the first controller 410A outputs a PWM signal for obtaining the current waveform shown in FIG. 5 to the first pre-driver 420A, and in addition, the second controller 410B outputs a PWM signal to the second pre-driver 420B in synchronization with the first controller 410A.

Next, a specific example embodiment of the control method of the power conversion device 1000 at abnormal times is described using a case in which a fault occurs in the first peripheral circuit 400A as an example. The control method described below is also applied when a fault occurs in the second peripheral circuit 400B.

For example, a case in which the first controller 410A is faulty in the first peripheral circuit 400A is considered. Since the first controller 410A is faulty, a PWM signal may not be outputted to the first pre-driver 420A. As a result, although the first pre-driver 420A and the first inverter 100A are not faulty, the three-phase current flow control by the control at normal times cannot be performed.

When a fault of the first controller 410A is detected by using, for example, a watchdog timer, the second controller 410B switches control of the motor 200 from the control at normal times to the control at abnormal times. The second controller 410B directs the first driving circuit 440A to start operation. The first driving circuit 440A is supplied with the second power voltage from the second pre-driver 420B or the second power circuit 430. In this state, the first driving circuit 440A applies a control signal for turning on SW 101A_L, 102A_L and 103A_L of the first inverter 100A to the switches in response to the direction of starting the operation. As a result, SW 101A_L, 102A_L and 103A_L are in an on state at all times, and the node NA_L on the low side of the first inverter 100A may function as a neutral point. At this point, SW 101A_H, 102A_H and 103A_H of the first inverter 100A are in an off state.

Although the switch elements 313 and 315 may be either in an on or off state, it is desirable to be in an off state.

Figure 6:
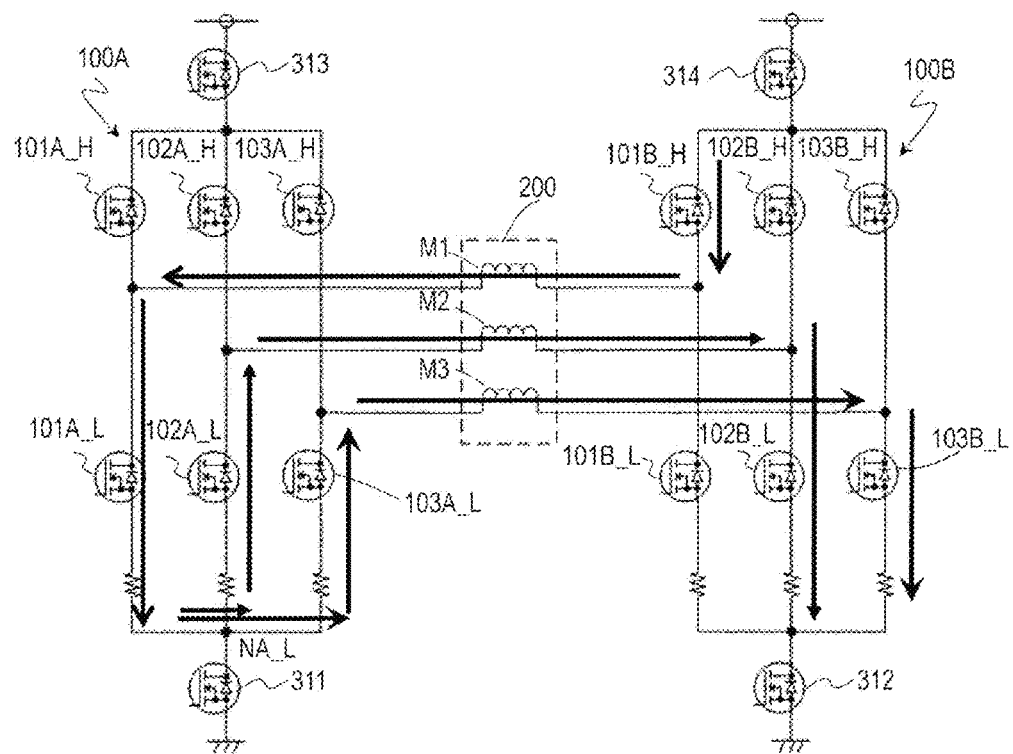
FIG. 6 is a mimetic view showing the shape of current flowing through two inverters at the electrical angle of 270° of the current waveform shown in FIG. 5.

FIG. 6 is a view showing the shape of the current flowing through two inverters at the electrical angle of 270° of the current waveform shown in FIG. 5.

The second controller 410B may continue the three-phase current flow control using the neutral point of the first inverter 100A by outputting a PWM signal to the second pre-driver 420B. For example, the second controller 410B may flow current through the windings M1, M2 and M3 by outputting a PWM signal for obtaining the current waveform shown in FIG. 5 to the switch element of the second inverter 100B.

According to the first example embodiment of the present disclosure, although the first controller 410A is faulty, since the first driving circuit 440A is controlled by the second controller 410B which is not faulty, the three-phase current flow control using a neutral point can be continued.

As another example embodiment, a case in which the first power circuit 430A is faulty in the first peripheral circuit 400A is considered. Since the first power circuit 430A is faulty, power voltage is not supplied to the first controller 410A and the first pre-driver 420A. As a result, the first controller 410A and the first pre-driver 420A become inoperable. Although the first inverter 100A is not faulty, the three-phase current flow control by the control at normal times cannot be performed.

When a fault of the first power circuit 430A is detected, the second controller 410B directs the first driving circuit 440A to start operation. Since the first driving circuit 440A is supplied with the second power voltage from the second pre-driver 420B or the second power circuit 430B, the fault of the first power circuit 430A does not affect the first driving circuit 440A. In this state, the first driving circuit 440A applies a control signal for turning on SW 101A_H, 102A_H and 103A_H of the first inverter 100A to the switches in response to the direction of starting the operation.

According to the first example embodiment of the present disclosure, although the first power circuit 430A is faulty, since the second power voltage is supplied to the first driving circuit 440A, and in addition, the first driving circuit 440A is controlled by the second controller 410B which is not faulty, the three-phase current flow control using a neutral point can be continued.

As another example embodiment, a case in which the first pre-driver 420A is faulty in the first peripheral circuit 400A is considered. Since the first pre-driver 420A is faulty, the three-phase current flow control by the control at normal times cannot be performed although the first inverter 100A is not faulty.

When a fault of the first pre-driver 420A is detected, the second controller 410B directs the first driving circuit 440A to start operation. Since the first driving circuit 440A is supplied with the second power voltage from the second pre-driver 420B or the second power circuit 430B, the fault of the first pre-driver 420A does not affect the first driving circuit 440A. In this state, the first driving circuit 440A applies a control signal for turning on SW 101A_L, 102A_L and 103A_L of the first inverter 100A to the switches in response to the direction of starting the operation. In addition, since the first controller 410A is not faulty and may operate when a power voltage is supplied, it is possible to control the first sub-driver 450A.

According to the first example embodiment of the present disclosure, although the first pre-driver 420A is faulty, since the second power voltage is supplied to the first driving circuit 440A, and in addition, the first driving circuit 440A is controlled by the second controller 410B which is not faulty, the three-phase current flow control using a neutral point can be continued.

Figure 7:
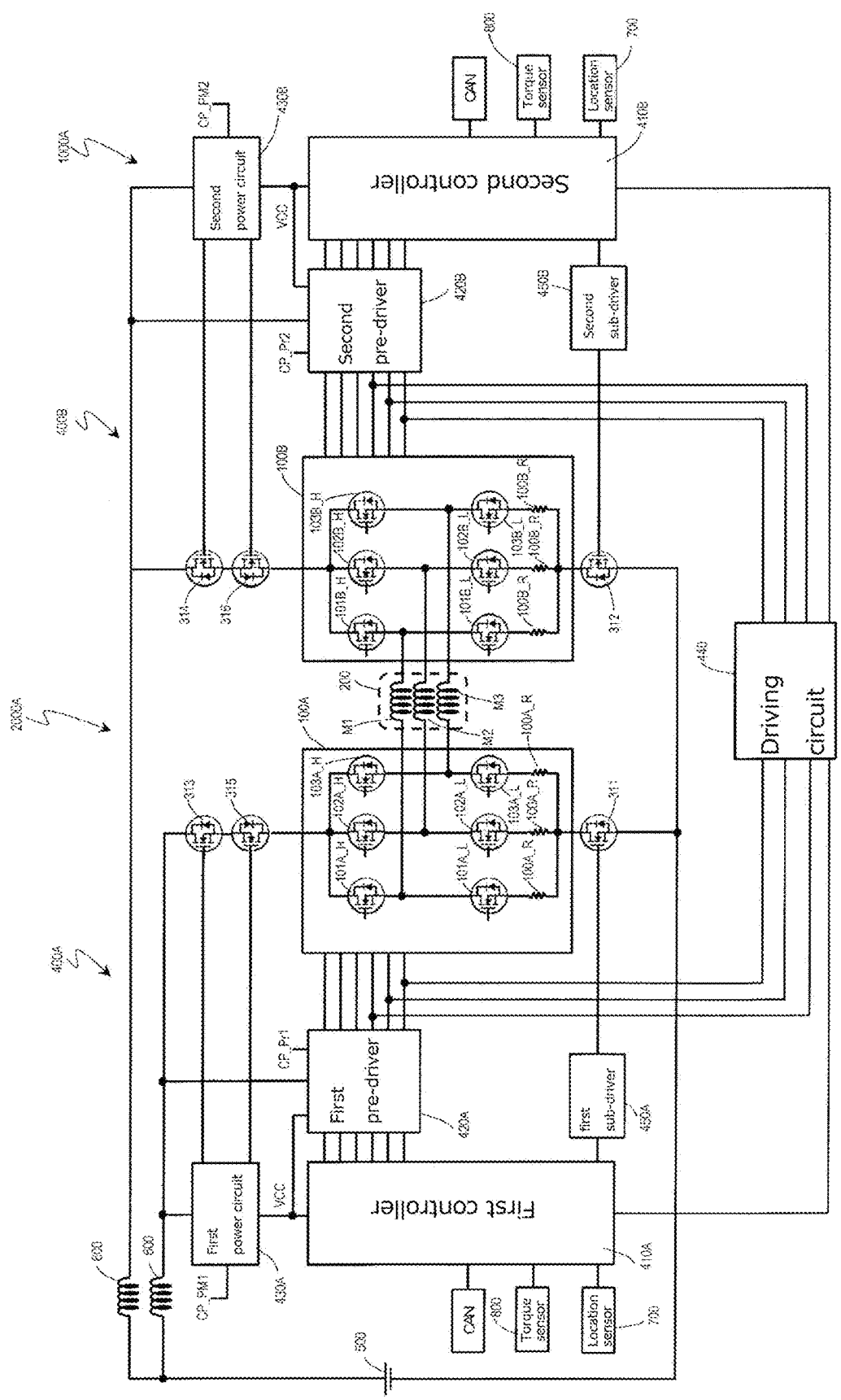
FIG. 7 is a mimetic view showing the block configuration of a motor module 2000A according to a second example embodiment of the present disclosure, mainly showing the block configuration of a power conversion device 1000A.
Figure 8:
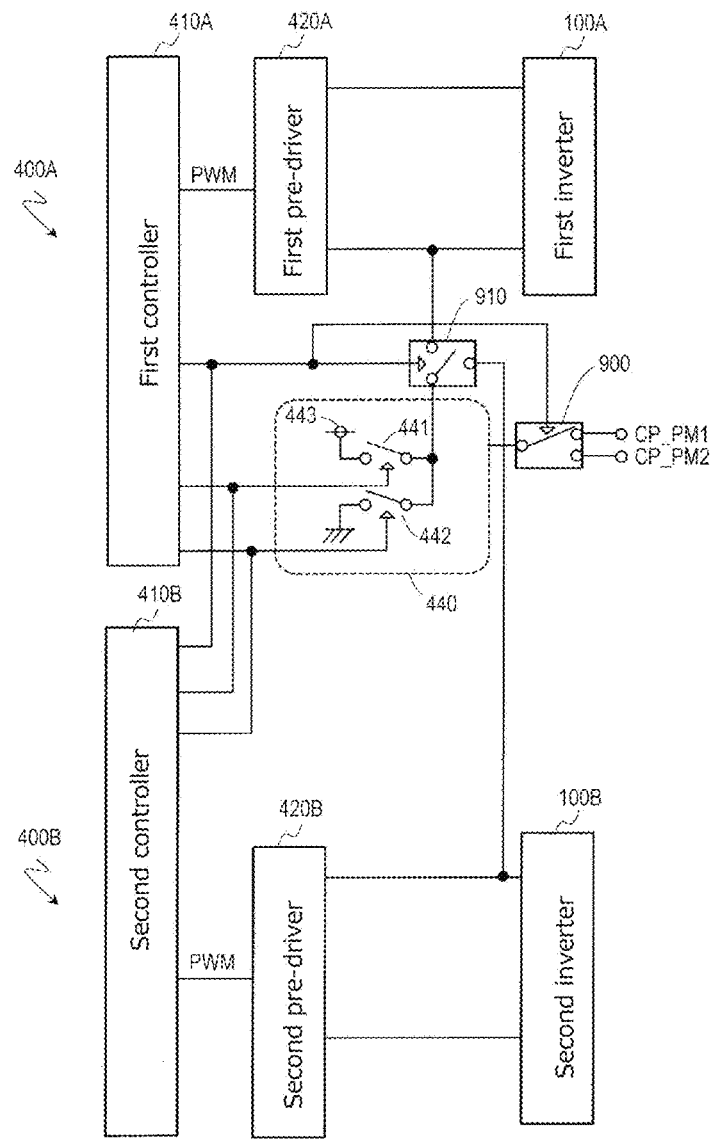
FIG. 8 is a block diagram showing the function blocks of a driving circuit 440 and periphery thereof.

FIG. 7 mimetically shows the block configuration of the motor module 2000A according to a second example embodiment of the present disclosure, mainly mimetically showing the block configuration of the power conversion device 1000A. FIG. 8 mimetically shows the function blocks of the driving circuit 440 and periphery thereof.

The power conversion device 1000A is different from the power conversion device 1000 according to the first example embodiment of the present disclosure in that the power conversion device 1000A has a driving circuit 440 common to the first inverter 100A and the second inverter 100B. Hereinafter, the difference with the first example embodiment of the present disclosure will be mainly described.

The power conversion device 1000A includes the driving circuit 440, a first switch 900 and a second switch 910 common to the first inverter 100A and the second inverter 100B.

The driving circuit 440 is connected to the three low side switch elements of the first inverter 100A and the three low side switch elements of the second inverter 100B. The driving circuit 440 applies a control signal for turning on the three low side switch elements of the first inverter 100A to the low side switch elements by supplying the second power voltage when a fault occurs on the first inverter 100A side of the motor 200, and in addition, applies a control signal for turning on the three low side switch elements of the second inverter 100B to the low side switch elements by supplying the first power voltage when a fault occurs on the second inverter 100B side.

The driving circuit 440 includes switches 441 and 442 like the first driving circuit 440A or the second driving circuit 440B of the first example embodiment of the present disclosure and may be configured with a plurality of transistors of an open collector output scheme and a plurality of resistors. The driving circuit 440 is controlled by the first controller 410A or the second controller 410B.

For example, a case in which a fault occurs in the first inverter 100A side, i.e., the first peripheral circuit 400A, is considered. When a fault is detected by communication with the first inverter 100A, the second controller 410B begins control of the driving circuit 440.

The first switch 900 switches supply of the first power voltage to the driving circuit 440 as the power voltage 443 with supply of the second power voltage to the driving circuit 440 as the power voltage 443 under the control of the first controller 410A and the second controller 410B. When a fault is detected by communication with the first inverter 100A, the second controller 410B controls the first switch 900 and determines supply of the second power voltage to the driving circuit 440 as the power voltage 443.

The second switch 910 switches supply of output of the driving circuit 440 from the driving circuit 440 to the three low side switch elements of the first inverter 100A with supply of output of the driving circuit 440 from the driving circuit 440 to the three low side switch elements of the second inverter 100B under the control of the first controller 410A and the second controller 410B. When a fault is detected by communication with the first inverter 100A, the second controller 100B controls the second switch 910 and determines supply of output of the driving circuit 440 to the three low side switch elements of the first inverter 100A.

According to the second example embodiment of the present disclosure, like the first example embodiment, although a fault occurs in the first peripheral circuit 400A or the second peripheral circuit 400B, the three-phase current flow control may be continued by using a neutral point in any one of the inverters. In addition, since the driving circuit 440 common to the first inverter 100A and the second inverter 100B is used, it is advantageous from the aspect of circuit area and cost.

The driving circuit 440 may be an integrated circuit or the like which combines the first driving circuit 440A and the second driving circuit 440B according to the first example embodiment of the present disclosure in one chip. Such a circuit type is also within the category of the present disclosure.

Figure 9:
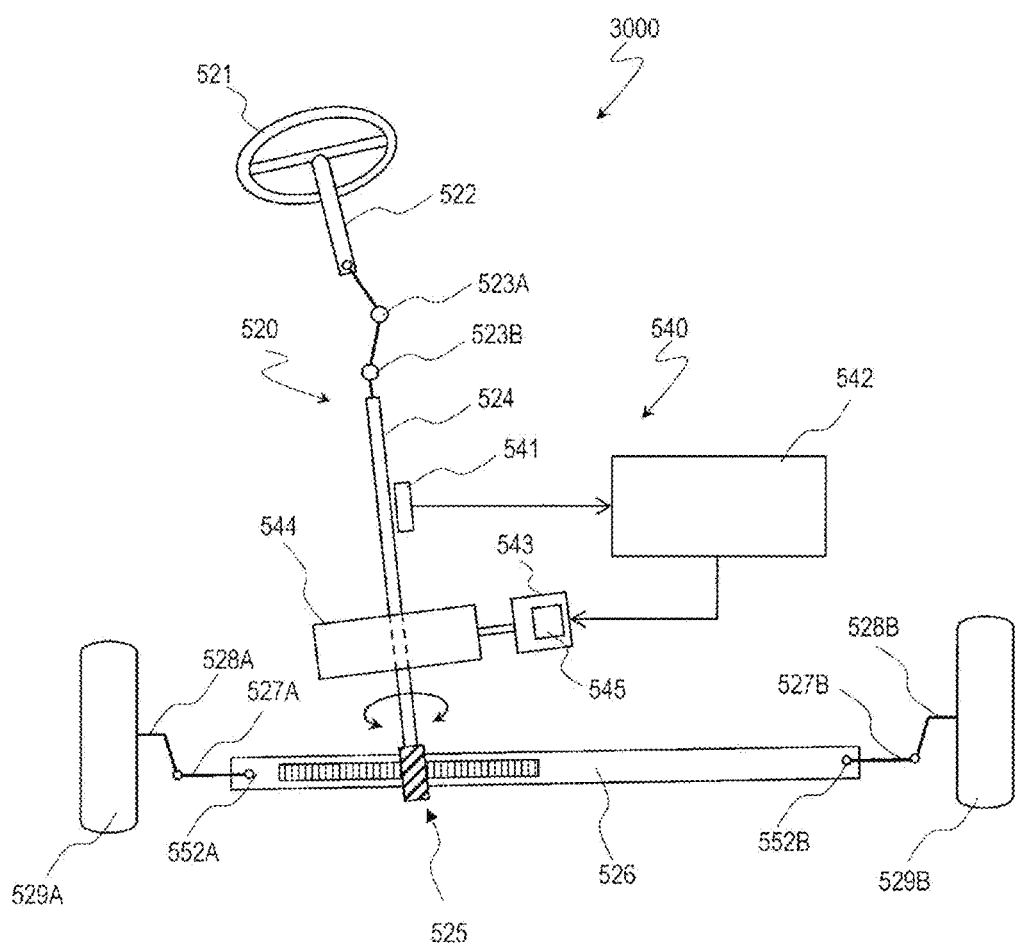
FIG. 9 is a mimetic view showing the typical configuration of an electric power steering device 3000 according to a third example embodiment of the present disclosure.

FIG. 9 mimetically shows the typical configuration of an electric power steering device 3000 according to a third example embodiment of the present disclosure.

Vehicles such as automobiles or the like generally have an electric power steering (EPS) device. An electric power steering device 3000 according to the third example embodiment of the present disclosure has a steering system 520 and an assistance torque mechanism 540 which generates assistance torque. The electric power steering device 3000 generates assistance torque supporting the steering torque of the steering system that is generated as an operator handles the steering wheel. By the assistance torque, the burden of the operator in handling the steering wheel is reduced.

The steering system 520 includes, for example, a steering wheel 521, a steering shaft 522, universal joints 523A and 523B, a rotating shaft 524, a rack and pinion mechanism 525, a rack shaft 526, left and right ball joints 552A and 552B, tie rods 527A and 527B, knuckles 528A and 528B, and left and right steerable wheel 529A and 529B.

The assistance torque mechanism 540 includes, for example, a steering torque sensor 541, an electronic control unit (ECU) 542 for a vehicle, a motor 543, and a speed reduction mechanism 544. The steering torque sensor 541 detects steering torque in the steering system 520. The ECU 542 generates a driving signal on the basis of the detection signal of the steering torque sensor 541. The motor 543 generates assistance torque according to the steering torque on the basis of the driving signal. The motor 543 transfers the generated assistance torque to the steering system 520 through the speed reduction mechanism 544.

The ECU 542 has, for example, a first peripheral circuit 400A and a second peripheral circuit 400B according to the first example embodiment of the present disclosure. In a vehicle, an electronic control system having the ECU as a core is constructed. In the electric power steering device 3000, the motor driving unit is constructed by, for example, the ECU 542, the motor 543 and the inverter 545. The motor modules 2000 and 2000A according to the first and second example embodiments of the present disclosure may be properly used in the unit.

The example embodiments of the present disclosure may be widely used in various devices having various motors, such as a cleaner, a drier, a ceiling fan, a washing machine, a refrigerator, an electric power steering device and the like.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device to convert power received from a power supply into power supplied to a motor including windings of n phases, n being an integer equal to or greater than 3, the power conversion device comprising:
   a first inverter connected to a first end of a winding of each phase of the motor and including n legs, each of which includes a low side switch element and a high side switch element;
   a second inverter connected to a second end of the winding of each phase and including n legs, each of which includes a low side switch element and a high side switch element;
   a first control circuit to control switching operations of n low side switch elements and n high side switch elements in the first inverter;
   a second control circuit to control switching operations of n low side switch elements and n high side switch elements in the second inverter; and
   a driving circuit connected to the n low side switch elements of the first inverter and the n low side switch elements of the second inverter to apply a control signal to turn on the n low side switch elements of the first inverter to the n low side switch elements when a fault occurs on the first inverter side of the motor, and apply a control signal to turn on the n low side switch elements of the second inverter to the n low side switch elements when a fault occurs on the second inverter side of the motor; wherein
   a first power voltage generated on the first inverter side of the motor is supplied to the driving circuit when a fault occurs on the second inverter side of the motor, and a second power voltage generated on the second inverter side of the motor is supplied to the driving circuit when a fault occurs on the first inverter side of the motor.

2. The power conversion device according to claim 1, wherein the driving circuit includes:
   a first driving circuit connected to the n low side switch elements of the first inverter, to apply the control signal to turn on the n low side switch elements of the first inverter to the n low side switch elements, when a fault occurs on the first inverter side of the motor, by supplying the second power voltage; and
   a second driving circuit connected to the n low side switch elements of the second inverter, to apply the control signal to turn on the n low side switch elements of the second inverter to the n low side switch elements, when a fault occurs on the second inverter side of the motor, by supplying the first power voltage.

3. The power conversion device according to claim 2, wherein the first driving circuit is controlled by the second control circuit, and the second driving circuit is controlled by the first control circuit.

4. The power conversion device according to claim 2, further comprising:
   a first pre-driver to generate a control signal to control switching operations of then low side switch elements and the n high side switch elements in the first inverter under the control of the first control circuit, and apply the control signal to the n low side switch elements and the n high side switch elements; and
   a second pre-driver to generate a control signal to control switching operations of the n low side switch elements and the n high side switch elements in the second inverter under the control of the second control circuit, and apply the control signal to the n low side switch elements and the n high side switch elements.

5. The power conversion device according to claim 4, further comprising:
   a first power circuit to supply power voltage to the first control circuit and the first pre-driver; and
   a second power circuit to supply power voltage to the second control circuit and the second pre-driver; wherein
   at least one of the first power circuit and the first pre-driver generates the first power voltage higher than a voltage of the power supply, at least one of the second power circuit and the second pre-driver generates the second power voltage higher than the voltage of the power supply, the first power voltage is supplied from the first power circuit or the first pre-driver to the second driving circuit, and the second power voltage is supplied from the second power circuit or the second pre-driver to the first driving circuit.

6. The power conversion device according to claim 5, further comprising:
   a first control signal line connecting the first driving circuit and the second control circuit to control the first driving circuit;
   a second control signal line connecting the second driving circuit and the first control circuit to control the second driving circuit;

a first power line to supply the first power voltage from the first power circuit or the first pre-driver to the second driving circuit; and a second power line to supply the second power voltage from the second power circuit or the second pre-driver to the first driving circuit.

7. The power conversion device according to 4, further comprising:

a first boost circuit to generate the first power voltage by boosting the voltage of the power supply; and a second boost circuit to generate the second power voltage by boosting the voltage of the power supply; wherein the first power voltage is supplied from the first boost circuit to the second driving circuit, and the second power voltage is supplied from the second boost circuit to the first driving circuit.

8. The power conversion device according to claim 1, wherein an amplitude of the first power voltage is equal to an amplitude of the second power voltage.

9. The power conversion device according to claim 1, wherein the first control circuit and the second control circuit are connected to communicate with each other.

10. The power conversion device according to claim 9, wherein one of the first control circuit and the second control circuit monitors an occurrence of a fault in an inverter side connected to the other one of the first control circuit and the second control circuit by performing communication between the first control circuit and the second control circuit.

11. The power conversion device according to claim 10, wherein each of the first control circuit and the second control circuit includes a watchdog timer, and one of the first control circuit and the second control circuit monitors an occurrence of a fault in an inverter side connected to the other one of the first control circuit and the second control circuit by using the watchdog timer.

12. The power conversion device according to claim 9, wherein when a fault is detected on the second inverter side of the motor, the first control circuit directs the second driving circuit to start operation, and the second driving circuit applies the control signal to turn on the n low side switch elements of the second inverter to the n low side switch elements in response to the direction of starting the operation, and when a fault is detected on the first inverter side of the motor, the second control circuit directs the first driving circuit to start operation, and the first driving circuit applies the control signal to turn on the n low side switch elements of the first inverter to the n low side switch elements in response to the direction of starting the operation.

13. The power conversion device according to claim 5, wherein the first control circuit and the second power circuit are connected to communicate with each other, and the second control circuit and the first power circuit are connected to communicate with each other.

14. The power conversion device according to claim 4, further comprising:

a first monitoring signal line to connect the first pre-driver and the second control circuit to monitor a fault of the first pre-driver; and a second monitoring signal line to connect the second pre-driver and the first control circuit to monitor a fault of the second pre-driver.

15. The power conversion device according to claim 1, further comprising:

a first switch element to switch connection and disconnection of the first inverter and a ground;

a second switch element to switch connection and disconnection of the second inverter and the ground;

a third switch element to switch connection and disconnection of the first inverter and the power supply; and a fourth switch element to switch connection and disconnection of the second inverter and the power supply.

16. The power conversion device according to claim 4, wherein a voltage level of the control signal applied to the n low side switch of the first inverter by the first driving circuit is higher than a voltage level of the control signal applied to the n low side switch of the first inverter by the first pre-driver, and a voltage level of the control signal applied to the n low side switch of the second inverter by the second driving circuit is higher than a voltage level of the control signal applied to then low side switch of the second inverter by the second pre-driver.

17. The power conversion device according to claim 4, wherein a voltage level of the control signal applied to the n low side switch of the first inverter by the first driving circuit is equal to a voltage level of the control signal applied to the n high side switch of the first inverter by the first pre-driver, and a voltage level of the control signal applied to the n low side switch of the second inverter by the second driving circuit is equal to a voltage level of the control signal applied to the n high side switch of the second inverter by the second pre-driver.

18. The power conversion device according to claim 16, wherein each of the first driving circuit and the second driving circuit includes a plurality of transistors of an open collector output scheme.

19. The power conversion device according to claim 16, further comprising:

a first protection circuit to suppress input of a signal of a voltage level higher than a regulation value into the first pre-driver when the control signal to turn on the n low side switch elements is outputted from the first driving circuit to the first inverter; and a second protection circuit to suppress input of a signal of a voltage level higher than a regulation value into the second pre-driver when the control signal to turn on the n low side switch elements is outputted from the second driving circuit to the second inverter.

20. The power conversion device according to claim 19, wherein each of the first protection circuit and the second protection circuit includes a Zener diode.

21. The power conversion device according to claim 1, further comprising a switch to switch supply of the first power voltage to the driving circuit with supply of the second power voltage to the driving circuit under the control of the first control circuit and the second control circuit.

22. A motor module comprising:

the motor; and the power conversion device described in claim 1.

23. An electric power steering device comprising the motor module described in claim 22.

* * * * *